United States Patent Office 3,268,360
Patented August 23, 1966

3,268,360
COMPOSITION COMPRISING DIISOCYANATE METHYLOL-PHOSPHORUS POLYMER AND ORGANIC TEXTILE FLAME-PROOFED THEREWITH
John V. Beninate, George L. Drake, Jr., and Wilson A. Reeves, Metairie, La., assignors to the United States of America as represented by the Secretary of Agriculture
No Drawing.   Filed May 10, 1963, Ser. No. 279,648
10 Claims.   (Cl. 117—136)

A non-exclusive, irrevocable, royalty-free license in the invention herein described, through the world for all purposes of the United States Government, with the power to grant sublicenses for such purposes, is hereby granted to the Government of the United States of America.

This invention relates to new phosphorus and nitrogen containing polymers, processes for their production, and processes of employing these polymers in the flame-proofing of certain organic fibrous materials.

In general this invention relates to polymers capable of being produced by the reaction of a phosphorus compound of the groups tetrakis(hydroxymethyl)phosphonium chloride, tris(hydroxymethyl)phosphine oxide, and mixtures thereof, hereafter referred to as THPC and THPO, with a monomeric nitrogen compound which contains at least two isocyanate or isothiocyanate radicals; and to processes of reducing the combustibility of hydrophilic fibrous organic materials.

We have discovered that tetrakis(hydroxymethyl)phosphonium chloride and tris(hydroxymethyl)phosphine oxide,

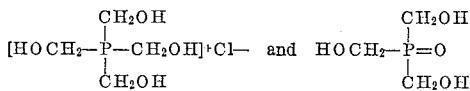

react with monomeric aliphatic, aromatic, and cyclic compounds containing at least two members of the group isocyanate radicals, attached to carbon atoms, to produce polymers. The polymers which are produced are cross-linked phosphorus and nitrogen containing polymers in which the recurring structural units each contain a phosphorus atom that is a component of a radical of the group tetamethylene phosphonium chloride

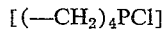

and trimethylene phosphine oxide [(—CH$_2$)$_3$P=O], and is linked to at least two isocyanate radicals by the connecting urethane structure.

Where the polymerization reaction is conducted in the presence of an amount of basic compound equivalent to the amount of chlorine present in the amount of THPC used, or where the polymers produced by the reaction of THPO, the recurring structural units of the polymers are composed of the phosphorus atoms which are members of a trimethylene phosphine oxide group and which are linked to at least two isocyanate radicals by the connecting urethane structure.

Such polymers can be produced in the form of solid synthetic resins. Such resins can be deposited on the surfaces and/or in the interstices of hydrophilic fibrous organic materials, i.e., organic materials which absorb or adsorb water on most of their surface area. When such organic fiber materials are treated with such resins, they reduce the combustibility of the hydrophilic fibrous organic materials and resist removal by laundering, dry cleaning, and the like chemical treatments. Such resins can be deposited on the surfaces of nonhydrophilic materials to form flame resistant coatings. Such reactions provide valuable new processes and products.

In the case of the aliphatic diisocyanates such as hexamethylene diisocyanate the reaction produces valuable new urethane polymers exhibiting to a rather widely variable control degree, the properties of a thermosetting non-combustible polymer. Such polymers contain the phosphorus and nitrogen groups of the type described above.

In the case of monomeric alicyclic compounds containing a least two isocyanate radicals such as cyclohexyl diisocyanate the reaction produces valuable new flame resistant polymers containing alicyclic rings and the above-described type of phosphorus and nitrogen groups.

In the case of the monomeric aromatic compounds containing at least two members of the group which contain at least two isocyanate radicals, such as toluene diisocyanate, the reaction produces valuable new flame resistant polymers containing aromatic rings and the above-described type of phosphorus and nitrogen groups.

Some of the above-class of polymers exhibit the unique property of foaming upon being heated, and essentially all of them form an intumescent char when exposed to a flame.

The polymers provided by this invention can be formed by reacting the phosphorus compounds with: (1) mixtures of the diisocyanate compounds, (2) mixtures of the phosphorus containing compounds.

Hydrophilic fibrous organic materials are rendered flame resistant by impregnating the material with dimethyl formamide (DMF) solutions, or homogeneous dispersion of the respective monomers, and curing the impregnated materials. Hexamethylene diisocyanate (HMDI) and toluene diisocyanate (TDI) are preferred members of the isocyanate compounds; and THPC, also mixtures of it, and THPO are preferred members of the phosphorus compounds.

The polymers provided by this invention can be produced in the form of hard brittle polymers, soft rubbery polymers, or semi-hard polymers. These products can be molded by the conventional techniques of molding thermosetting resins. These polymers are valuable materials for use in the production of molded synthetic plastic articles, such as buttons, food containers, electrical insulators, and the like; synthetic coatings, such as protective coatings and paints, varnishes and the like, having a reduced flammability due to the presence of some of the polymers; paper treating resins; textile resins and the like.

Condensation polymers of THPC and THPO with the isocyanates or isothiocyanates are preferably prepared by agitating a mixture of the phosphorus compounds and the diisocyanate compounds in DMF while heating until polymerization occurs. The preferred relative amounts of phosphorus and nitrogen compounds used to polymerize can be calculated by conventional methods used for condensation polymerization by assuming that: (1) THPC is tetrafunctional and THPO is trifunctional, (2) one methylol group of the phosphorus compound condenses with one of the isocyanate or isothiocyanate radicals attached to a carbon atom of the isocyanate compound, and (3) THPC is converted to THPO in the presence of bases in general.

For example, the mole ratio range for polymerizing THPC with a diisocyanate is about 1 mole THPC per about 0.2 to 3 moles of the diisocyanate compound with the preferred range of 0.3 to 3 moles of the diisocyanate compound per mole of THPC. When THPO is polymerized with a diisocyanate the reaction is essentially the same. The THPO can be made in situ, as described above.

THPC and/or THPO will copolymerize with materials and are in themselves capable of polymerizing (e.g., diisocyanates) over an extremely wide range. For example, trace quantities of THPC and/or THPO added to essentially a 100% solution of HMDI will copolymerize with HMDI to produce a new phosphorus and nitrogen containing resin. The new nitrogen and phosphorus polymers are formed until the quantity of THPC and/or THPO or the diisocyanate are used up in the formation of the polymer.

Polymerization reactions conducted in accordance with the process of this invention can be carried to the extent of producing solid, liquid, or gel-like polymers. Partial polymers can be isolated, and can be completely polymerized by conventional procedures of thermally completing the polymerization of partially polymerized thermosetting monomers.

The mixed flame retardant provided by this invention can be used in the pretreatment of vegetable textile materials such as cotton, flax, linen, ramie, and the like, chemically modified vegetable textile materials such as cyanoethylated, carboxymethylated, aminoethylated cottons and the like; regenerated cellulosic textile such as the viscose rayons; or proteinaceous textiles such as silk, wool, and the like. The textile materials can be treated in the form of slivers, yarns, threads, or fabrics. Polymers contained in the mixed flame retardants can be separately formed or can be produced in situ in the textile by a reaction of materials with which the textile is impregnated. The mixtures can be used as the only material with which the textile is impregnated or used in conjunction with other textile flameproofing, creaseproofing, wrinkleproofing and the like textile treating agents; or in conjunction with textile lubricants, water repellents, and the like textile treating agents. In the treatment of textiles interfacial polymerization is a possibility.

Where a textile is being impregnated, it is of advantage to remove the excess impregnating liquid by passing the textile through squeeze rolls adjusted to apply a comparatively extremely high pressure prior to drying and curing the impregnated textile. It is also of advantage to dry the textile at a temperature of about 85° C. to 110° C. to 180° C.

The degree of flameproofing imparted to a textile by these phosphorus and nitrogen resins can be varied from a low degree to a very high degree by varying the amount of polymer put in the fabric.

Some advantages of flameproofing textiles in accordance with this invention are as follows: textiles treated by this process are flame resistant, glow resistant, rot and mildew resistant; the effects of the treatment are permanent, and resistant to laundering, dry cleaning, alkali and acid treatments. The polymers themselves are intumescent when exposed to a flame.

The following examples are illustrations of the invention:

*Example 1.—A 1:1 mole ratio of toluenediisocyanate (TDI) to tetrakis(hydroxymethyl)phosphonium chloride (THPC)*

A solution consisting of 1.74 grams (.01 mole) of toluenediisocyanate (TDI), 1.9 grams (.01 mole) of tetrakis(hydroxymethyl)phosphonium chloride (THPC), and 10 ml. dimethyl formamide (DMF) was prepared, heated 4 minutes at 150° C., and allowed to cool to room temperature. A brittle, yellow polymer was produced. This polymer was flame resistant; was insoluble in water, ethanol, acetone, and benzene; and reacted to a direct hot flame by forming an intumescent char upon its surface, which prevented ignition.

*Example 2.—A 2:1 mole ratio of TDI to THPC*

A solution consisting of 3.5 grams (.02 mole) of TDI, 1.9 grams (.01 mole) of THPC, and 10 ml. of DMF was prepared, and treated as in Example 1. A brittle, orange colored polymer was produced. The solubility, flame resistance, and intumescence characteristics of this polymer were similar to those of Example 1. Elemental analysis yielded these figures: 12.38% nitrogen, and 5.44% phosphorus.

*Example 3.—A 3:1 mole ratio of TDI to THPC*

A solution consisting of 5.2 grams (.03 mole) of TDI, 1.9 grams (.01 mole) of THPC, and 12 ml. of DMF was prepared, and treated as in Example 1. A brittle, dark orange polymer was produced. The solubility, flame resistance, and intumescence characteristics of this polymer were similar to those of Example 1. The pH of the solution prior to polymerization was 3.5.

*Example 4.—A 1:2 mole ratio of TDI to THPC*

A solution consisting of 1.74 grams (.01 mole) of TDI, 3.8 grams (.02 mole) of THPC, and 12 ml. of DMF was prepared, and treated as in Example 1. A soft, rubbery, straw colored polymer was produced. The solubility, flame resistance, and intumescence characteristics of this polymer were similar to those of Example 1. Elemental analysis yielded these figures: 8.69% nitrogen, and 10.10% phosphorus.

*Example 5.—A 1:3 mole ratio of TDI to THPC*

A solution consisting of 1.74 grams (.01 mole) of TDI, 5.7 grams (.03 mole) of THPC, and 15 ml. of DMF was prepared, and treated as in Example 1. A semi-hard, rubbery, light orange colored polymer was produced. The solubility, flame resistance, and intumescence characteristics of this polymer were similar to those of Example 1.

*Example 6.—A 1:2 mole ratio of TDI to THPC cured at room temperature*

A solution consisting of 1.74 grams (.01 mole) of TDI, 3.8 grams (.02 mole) of THPC, and 12 ml. of DMF was prepared, and treated simply by allowing to polymerize at room temperature (ca. 28° C.), and examined and tested after 24 hours standing. A semi-hard, smooth, light yellow colored polymer was produced. The solubility, flame resistance, and intumescence characteristics of this polymer were similar to those of Example 1.

*Example 7.—A 1:2 mole ratio of TDI to THPC cured at 90° C.*

A solution was prepared as in Example 6, and heated 75 minutes at 90° C. A soft, rubbery, light yellow polymer was produced. The solubility, flame resistance, and intumescence characteriestics of this polymer were similar to those of Example 1.

*Example 8.—A 1:3:1 mole ratio of TDI to THPC to ethylene glycol (EG)*

A solution consisting of 1.74 grams (.01 mole) of TDI, 5.7 grams (.03 mole) of THPC, 0.62 gram (.01 mole) of EG, and 18 ml. of DMF was prepared, and treated as in Example 1. A flexible, foam type yellow colored polymer was produced. The solubility, flame resistance, and intumescence characteristics of this polymer were similar to those of Example 1.

*Example 9.—A 1:2 mole ratio of TDI to tris(hydroxymethyl)phosphine oxide*

A solution consisting of 1.74 grams (.01 mole) of TDI, 2.8 grams (.02 mole) of THPO, and 10 ml. of DMF was prepared, and treated as in Example 1. A soft, light yellow colored polymer was produced. The solubility, flame resistance, and intumescence characteristics of this polymer were similar to those of Example 1.

*Example 10*

A sample of cotton olive drab sateen was padded through a DMF solution containing 8.7% TDI and 19% THPC (1:2 mole ratio). The fabric was dried 4 minutes at 85° C., and cured 4 minutes at 150° C., followed by a hot water wash. The treated fabric had a resin add-on of 9.7%, and possessed fire resistant properties of consequence, as manifested by the formation of an intumescent black char when the sample was submitted to standard flame testing.

*Example 11*

A sample of cotton olive drab sateen was padded through a DMF solution containing 5.8% TDI, 19% THPC, and 2.1% EG (a mole ratio of 1:3:1). The fabric sample was dried, cured, and washed as in Example 10. The resin add-on was 6.0%, and the fabric possessed fire resistant properties equal to those of Example 10.

*Example 12.—A 1:1 mole ratio of hexamethylenediisocyanate (HMDI) to THPC*

A solution consisting of 1.68 grams (.01 mole) of HMDI, 1.9 grams (.01 mole) of THPC, and 10 ml. of DMF was prepared, and treated as in Example 1. A semi-hard, light yellow polymer was produced. The solubility, flame resistance, and intumescence characteristics of this polymer were similar to those of Example 1.

*Example 13.—A 2:1 mole ratio of HMDI to THPC*

A solution consisting of 3.36 grams (.02 mole) of HMDI, 1.9 grams (.01 mole) of THPC, and 10 ml. of DMF was prepared, and treated as in Example 1. A rubbery, light yellow colored polymer was produced. The solubility, flame resistance, and intumescence characteristics of this polymer were similar to those of Example 1.

*Example 14.—A 1:2 mole ratio of HMDI to THPC*

A solution consisting of 1.68 grams (.01 mole) of HMDI, 3.8 grams (.02 mole) of THPC, and 12 ml. of DMF was prepared, and treated as in Example 1. A rubbery, light yellow colored polymer was produced. The solubility, flame resistance, and intumescence characteristics of this polymer were similar to those of Example 1.

*Example 15.—A 1:3:1 mole ratio of HMDI to THPC to EG*

A solution consisting of 1.68 grams (.01 mole) of HMDI, 5.7 grams (.03 mole) of THPC, 0.62 gram (.01 mole) of EG, and 18 ml. of DMF was prepared, and treated as in Example 1. A soft, rubbery, light yellow colored polymer was produced. The solubility, flame resistance, and intumescence characteristics of this polymer were similar to those of Example 1.

*Example 16.—A 2:1:1 mole ratio of HMDI to THPC to N,N' - dinitroso - N,N' - dimethylterephthalamide (NDT), as blowing agent*

A solution consisting of 3.36 grams (.02 mole) of HMDI, 1.9 grams (.01 mole) of THPC, 2.5 grams (.01 mole) of NDT, and 15 ml. of DMF was prepared, and treated as in Example 1. A waxy and flexible, pale yellow colored polymer was produced. The solubility, flame resistance characteristics of this polymer were similar to those of Example 1.

*Example 17.—A 1:2:1 mole ratio of TDI to THPC to NDT*

A solution consisting of 1.74 grams (.01 mole) of TDI, 3.8 grams (.02 mole) of THPC, 2.5 grams (.01 mole) of NDT, and 17 ml. of DMF was prepared, and treated as in Example 1. A tough, filmy type, yellow colored polymer was produced. The solubility, flame resistance, and intumescence characteristics of this polymer were similar to those of Example 1.

*Example 18*

A sample of cotton olive drab sateen was padded through a DMF solution containing 22.4% HMDI and 12.7% THPC (mole ratio of 2:1). The fabric was dried, cured, and washed as in Example 10. The resin add-on was 10.1%, and the fabric possessed fire resistant properties equal to those of Example 10.

*Example 19*

A sample of cotton olive drab sateen was padded through a DMF solution containing 6.5% HMDI, 21.9% THPC, and 2.4% EG (mole ratio of 1:3:1). The fabric was dried, cured, and washed as in Example 10. The resin add-on was 5.2%, and the fabric possessed fire resistant properties equal to those of Example 10.

*Example 20*

A sample of wool, a sample of rayon, and a sample of jute were padded through a DMF solution containing 22.4% HMDI, and 12.7% THPC (mole ratio of 2:1). The fabrics were dried, cured, and washed as in Example 10. The resin weight gains were correspondingly 13.6%, 8.8%, and 8.28%. All fabrics possessed fire resistant properties equal to those of Example 10.

We claim:

1. The polymers produced by mixing toluenediisocyanate and tetrakis(hydroxymethyl)phosphonium chloride in solution with dimethylformamide in mole ratios of from about 1:3 to about 3:1, and polymerizing at temperatures from about 28° C. to about 150° C. for periods of time ranging from about 24 hours to about 4 minutes, the longer periods of time being used in conjunction with the lower temperatures, and the shorter periods of time with the higher temperatures.

2. The polymers produced by mixing toluenediisocyanate and tris(hydroxymethyl)phosphine oxide in solution with dimethylformamide in mole ratios of from about 1:3 to about 3:1, and polymerizing at temperatures from about 28° C. to about 150° C. for periods of time ranging from about 24 hours to about 4 minutes, the longer periods of time being used in conjunction with the lower temperatures, and the shorter periods of time with the higher temperatures.

3. The polymers prdouced by mixing hexamethylenediisocyanate and tetrakis(hydroxymethyl)phosphonium chloride in solution with dimethylformamide in mole ratios of from about 1:3 to about 3:1, and polymerizing at temperatures from about 28° C. to about 150° C. for periods of time ranging from about 24 hours to about 4 minutes, the longer periods of time being used in conjunction with the lower temperatures, and the shorter periods of time with the higher temperatures.

4. A process for reducing the flammability of a textile by means of a heat sensitive intumescing resin coating, which comprises impregnating said textile fabric with the inert solvent solution of a phosphorus containing reagent selected from the group consisting of tetrakis(hydroxymethyl)phosphonium chloride and tris(hydroxymethyl)phosphine oxide in combination with an inert solvent solution of a monomeric isocyanate reagent containing a plurality of isocyanate groups, the phosphorus containing material and the isocyanate material being present in the mole ratio of from about 1:3 to about 3:1; drying the impregnated fabric, and curing for a suitable length of time.

5. The process of claim 4 wherein the textile fabric is cotton.

6. The process of claim 4 wherein the textile fabric is wool.

7. The process of claim 4 wherein the textile fabric is rayon.

8. The process of claim 4 wherein the textile fabric is jute.

9. A process for reducing the flammability of a cotton textile fabric by means of a heat sensitive intumescing resin coating which comprises impregnating said textile fabric with the inert solvent solution of a phosphorus containing reagent selected from the group consisting of tetrakis(hydroxymethyl)phosphonium chloride and tris(hydroxymethyl)phosphine oxide in combination with an inert solvent solution of a monomeric isocyanate reagent containing a plurality of isocyanate groups and a blowing agent selected from the group consisting of ethylene glycol and N,N'-dinitroso-N,N'-dimethylterephthalamide, the phosphorus containing material and the isocyanate material being present in the mole ratio of from about 1:3 to about 3:1, and the blowing agent being present in a mole ratio of about one; drying the impregnated fabric, and curing and washing at suitable temperatures.

10. The polymers produced by mixing in inert solvent a phosphorus containing reagent selected from the group consisting of tetrakis(hydroxymethyl)phosphonium chloride and tris(hydroxymethyl)phosphine oxide with a monomeric isocyanate reagent containing a plurality of isocyanate groups and a blowing agent selected from the group consisting of ethylene glycol and N,N'-dinitroso-N,N'-dimethylterephthalamide, the phosphorus containing material and the isocyanate material being present in the mole ratio of from about 1:3 to about 3:1 and the blowing agent being present in a mole ratio of about one, and polymerizing at a temperature of about 150° C. for about 4 minutes.

References Cited by the Examiner
UNITED STATES PATENTS

| | | | |
|---|---|---|---|
| 2,691,566 | 10/1954 | Kvalnes et al. | |
| 3,041,207 | 6/1962 | Caldwell | 117—136 |
| 3,116,315 | 12/1963 | Rauhut | 117—136 X |
| 3,116,316 | 12/1963 | Rauhut | 117—136 X |

WILLIAM D. MARTIN, *Primary Examiner.*

T. G. DAVIS, *Assistant Examiner.*